United States Patent

Jeon et al.

[11] Patent Number: 5,999,545
[45] Date of Patent: Dec. 7, 1999

[54] OPTICAL FIBER LASER AND A METHOD OF LOCKING A COMBINED MODE UTILIZING THEREOF

[75] Inventors: Min Yong Jeon; Hak Kyu Lee; Kyong Hon Kim; El Hang Lee, all of Daejon-Shi, Rep. of Korea

[73] Assignee: Electronics and Telecommunications Research Institute, Daejon-Shi, Rep. of Korea

[21] Appl. No.: 08/971,678

[22] Filed: Nov. 17, 1997

[30] Foreign Application Priority Data

Nov. 27, 1996 [KR] Rep. of Korea ...................... 96-58193

[51] Int. Cl.⁶ ........................................................ H01S 3/30
[52] U.S. Cl. .................................. 372/6; 372/22; 372/18; 385/24
[58] Field of Search .................................. 372/6, 21, 22, 372/18, 27; 385/24, 11, 7

[56] References Cited

U.S. PATENT DOCUMENTS 5,359,612  10/1994  Dennis et al. ............................. 372/18
5,414,725  5/1995   Fermann et al. .......................... 372/18
5,577,057  11/1996  Frisken ....................................... 372/6

OTHER PUBLICATIONS

A. B. Grudinin et al., "Passive harmonic modelocking of a fibre soliton ring laser", Electronics Letters, Oct. 14, 1993, vol. 29, No. 21, pp. 1860–1861.

*Primary Examiner*—Hung N. Ngo
*Attorney, Agent, or Firm*—Jacobson, Price, Holman & Stern, PLLC

[57] ABSTRACT

The present invention discloses an optical fiber laser and a method of harmonic mode locking utilizing the optical fiber laser, which is capable of locking a harmonic frequency occurred by inserting an optical modulator between a Faraday rotator mirror and a non-linear amplifying loop mirror to coincide the frequency component of the optical modulator with the frequency component of the longitudinal mode of the laser. In order to achieve the object of the present invention, it comprises an optical fiber laser which comprises a non-linear amplifying loop mirror, a linear mirror and an optical fiber directional coupler or fiber coupler.

3 Claims, 4 Drawing Sheets

OPTICAL FIBER LASER AND A METHOD OF LOCKING A COMBINED MODE UTILIZING THEREOF

BACKGROUND OF THE INVENTION

1. Field of the Invention

The present invention relates to an optical fiber laser and a method of harmonic mode locking utilizing thereof, and more particularly to an optical fiber laser and a method of harmonic mode locking utilizing thereof which is capable of harmonic mode locking by inserting an opto-acoustic variable filter into the optical fiber laser which uses an Erbium Doped fiber as a gain medium.

2. Description of the Related Art

In advance to explain the present invention, the problem of the conventional method will be described with reference to FIGS. 1 and 2, more in detail. In order to obtain a high repetition rate at an optical fiber laser, a structure representing an active mode locking is shown in FIG. 1, and a structure representing a passive mode locking is shown in FIG. 2 according to the prior art. In FIGS. 1 and 2, the reference numeral 11 denotes a 50:50 optical fiber directional coupler or fiber coupler, the reference numeral 12 a wavelength division multiplier fiber coupler, the reference numeral 21 a polarization controller, the reference numeral 32 an optical isolating polarizer, the reference numeral 42 an Erbium doped optical fiber, the reference numeral 43 a single mode optical fiber for general communication, the reference numeral 51 980 nm optical pumping laser diode, and the reference numeral 81 an optical modulator, respectively.

In order to oscillate an ultrashort optical pulse and obtain a high repetition rate at the optical fiber laser according to the prior art, it can be obtained from the active mode locking by modulating the amplitude or the phase of the optical laser utilizing an high speed optical modulator, as can be referred to in FIG. 1. In this structure, the high repetition rate is determined depending on the frequency applied to the optical modulator 81. Therefore, the high repetition rate which oscillates the ultra optical pulse has an limit according to the frequency applied to the optical modulator 81.

In the meantime, a optical pulse source having a high repetition rate can also be obtained in the structure of the passive mode locking, as shown in FIG. 2. In this structure, the high repetition rate is obtained by a desired physical phenomenon in the laser resonator, which occurs the harmonic mode locking in the frequency corresponding to the higher order of the longitudinal mode in the laser resonator. However, in this structure, the output of the optical source is unstable. Therefore, it is difficult to obtain a normal repetition rate of the optical pulse.

Therefore, it is an object of the present invention to overcome the above disadvantages and provide an optical fiber laser and a method of harmonic mode locking utilizing the optical fiber laser, which is capable of harmonic mode locking by inserting an acousto-optic modulator between a Faraday rotator mirror and a 3dB directional coupler in the structure utilizing the non-linear amplifying loop mirror and Faraday rotator mirror.

SUMMARY OF THE INVENTION

An optical fiber laser and a method of harmonic mode locking utilizing thereof according to the present invention is defined by the claims with a specific embodiment shown in the attached drawings. For the purpose of summarizing the invention, the first embodiment of the present invention relates to an optical fiber laser which comprises a non-linear amplifying loop mirror, a linear mirror and an optical fiber directional coupler or fiber coupler.

The non-linear amplifying loop mirror further comprises an optical pumping laser diode for outputting light which excites a gain medium to oscillate a desired optical wave. The wavelength division multiplier fiber coupler receives the light outputted from the optical pumping laser diode. The Erbium doped optical fiber sequentially oscillates the desired optical wave by receiving the light outputted from the optical pumping laser diode through the wavelength division multiplier fiber coupler. The dispersion shifted optical fiber provides the light, which is oscillated at the Erbium doped optical fiber to travel it, with the non-linear effect. The first polarization controller controls the polarization of the traveled light to allow the output of the sequentially oscillated light wave to be maximized. The linear mirror further comprises a second polarization controller for controlling the polarization of the traveled light to allow the light wave oscillated at the non-linear amplifying loop mirror to be mode-locked. The Faraday rotator mirror is provided to 90° shift the polarization of light when the traveled light wave is reflected from a minor surface. The acousto-optic modulator modulates the amplitude of the traveled light wave. The function generator controls the frequency applied to the acousto-optic modulator. The optical fiber directional coupler or fiber coupler is connected between the non-linear amplifying loop mirror and the linear mirror for transferring a portion of the optical wave outputted from the non-linear amplifying loop mirror to the linear mirror. The optical fiber directional coupler or fiber coupler further transfers the remaining portion of the optical wave to an output port, and also transfers the optical wave reflected from to the linear mirror to the non-linear amplifying loop mirror, respectively.

According to a method of harmonic mode locking utilizing the optical fiber laser of the second embodiment of the present invention, a method of harmonic mode locking is characterized in that an optical fiber laser as defined in the first embodiment of the present invention, wherein a harmonic mode locking is performed utilizing a harmonic frequency component of the optical modulator in such a way that the frequency is applies to the optical fiber laser which is constituted with a non-linear amplifying loop mirror and a Faraday rotator mirror.

According to a method of harmonic mode locking utilizing the optical fiber laser of the third embodiment of the present invention, a method of harmonic mode locking is characterized in that an optical fiber laser as defined in the first embodiment of the present invention, wherein the harmonic mode locking is performed by matching a frequency component of an optical modulator and a frequency component of a longitudinal mode in a laser resonator.

According to the present invention, the repetition rate of the optical pulse can be highly improved by combining the method used in the structure of the active mode locking and passive mode locking.

BRIEF DESCRIPTION OF THE DRAWINGS

The present invention will become more apparent upon a detailed description of the preferred embodiments for carrying out the invention as rendered below.

The operation of the embodiment of the present invention as discussed above will now be described in detail.

DETAILED DESCRIPTION OF THE INVENTION

A method of forming a metal wiring film according to the present invention will now be described with reference to FIGS. 3A, 3B and 4.

Figure 1:
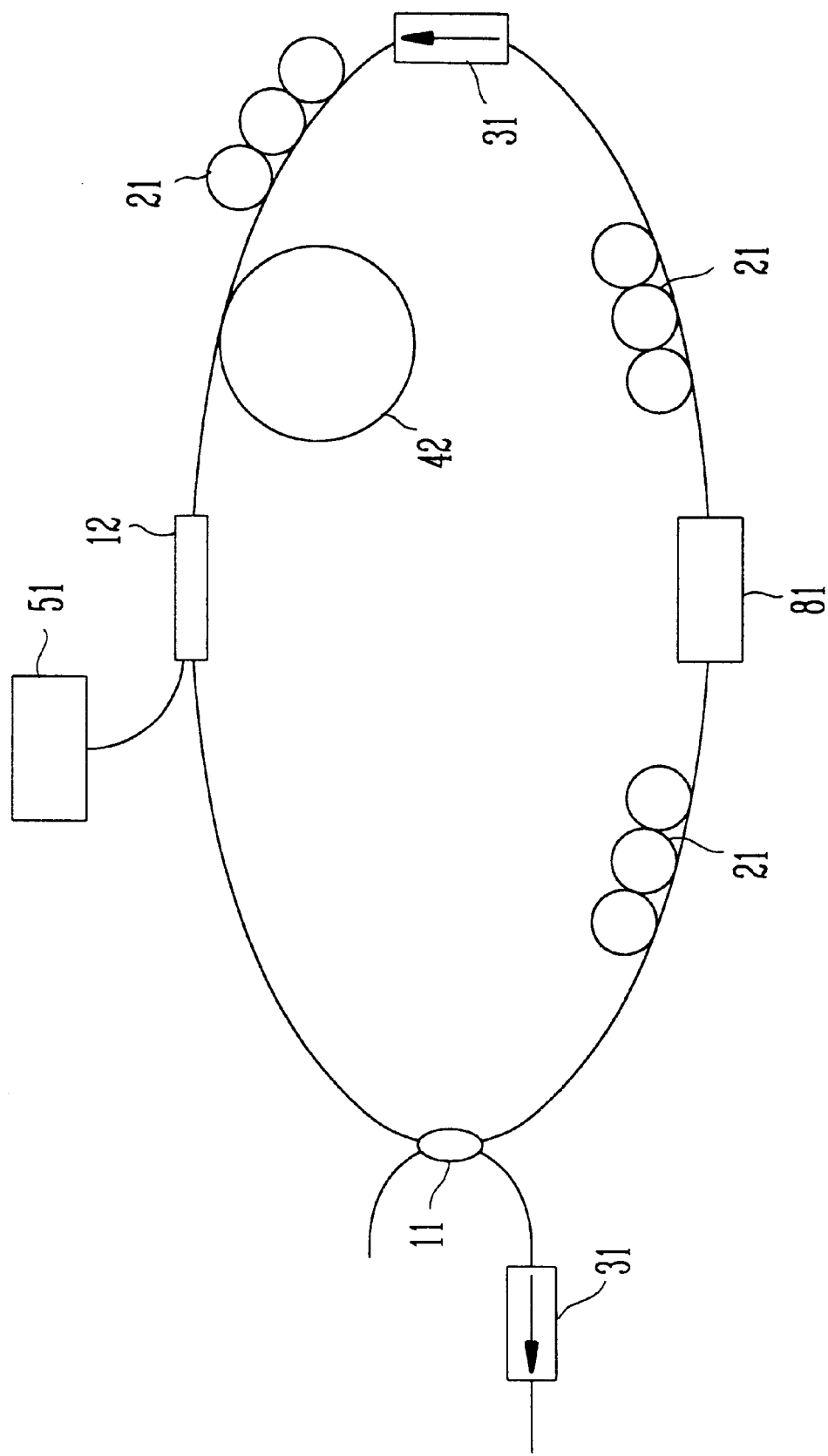
FIG. 1 shows a structure representing an active mode locking in order to obtain a high repetition rate at an optical fiber laser according to the prior art.
Figure 2:
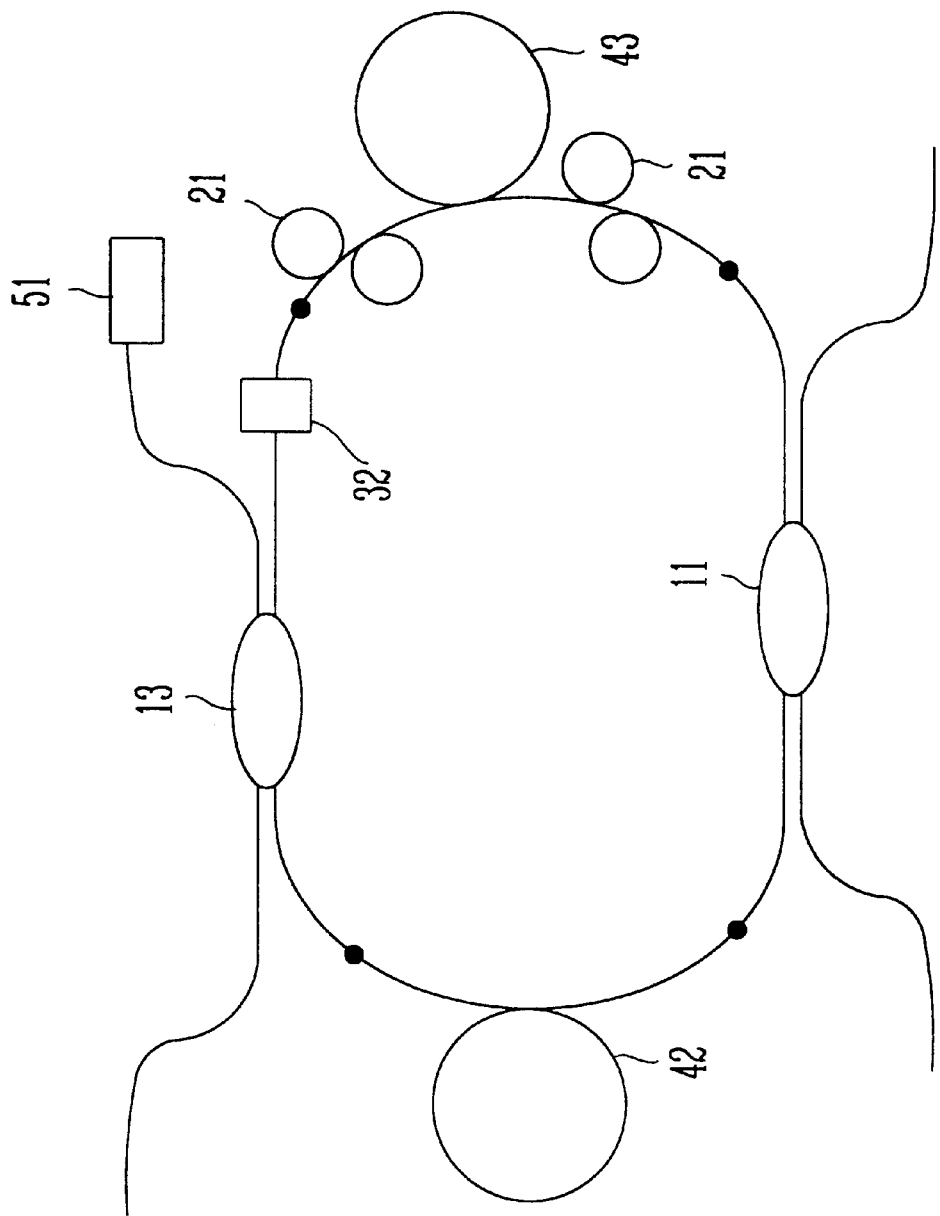
FIG. 2 illustrates a structure representing a passive mode locking in order to obtain a high repetition rate at an optical fiber laser according to the prior art.
Figure 3A:
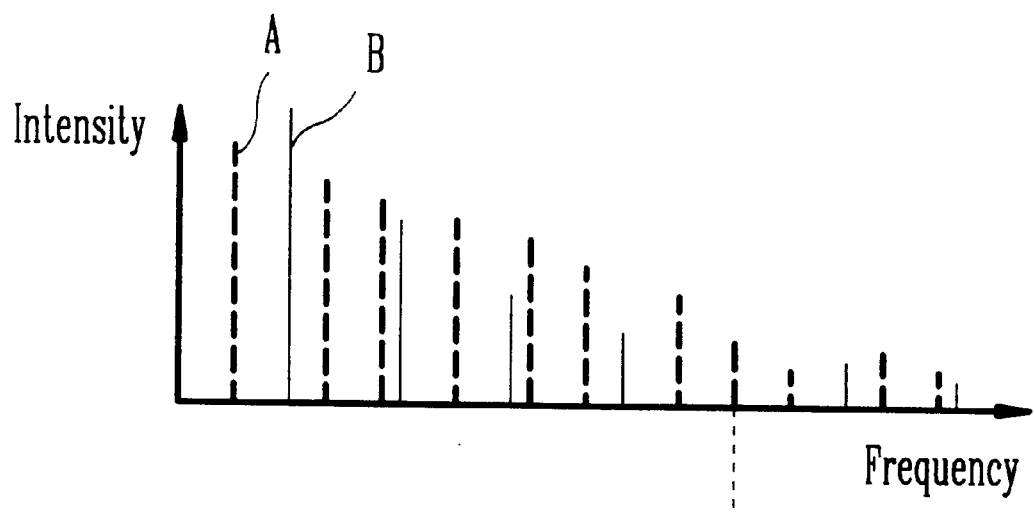
FIGS. 3A and 3B are perspective views for explaining a principle of the present invention.
Figure 3B:
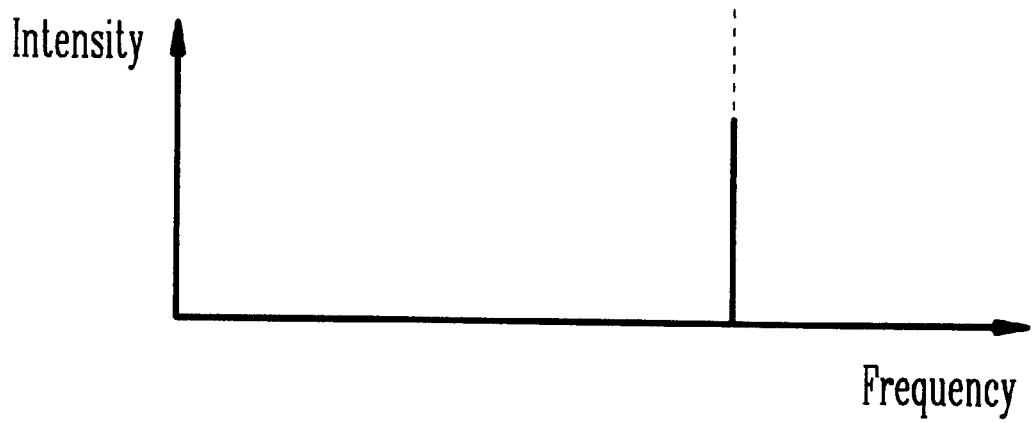

Referring now to FIG. 3A and 3B, it represents perspective views for explaining a principle of the present invention. In FIG. 3B, the frequency components B of the optical modulator and the longitudinal mode components A of the laser resonator are shown. Here, there is shown the frequency which coincides each other among the two frequency components. The combined mode locking occurs at the coincided frequency.

In FIG. 3B, the combined mode locking frequency components at the frequency at which the frequency components of the optical modulator and the longitudinal mode components A of the laser resonator coincide each other. Here, the repetition rate at the conventional laser is obtained at the first frequency components, as shown in FIG. 3A. However, according to the present invention, the mode locking frequency is oscillated at the higher frequency components, so that the more higher repetition rate can be obtained. Further, the unstable of the combined mode locking optical source obtained from the conventional passive mode locking can be avoided.

Figure 4:
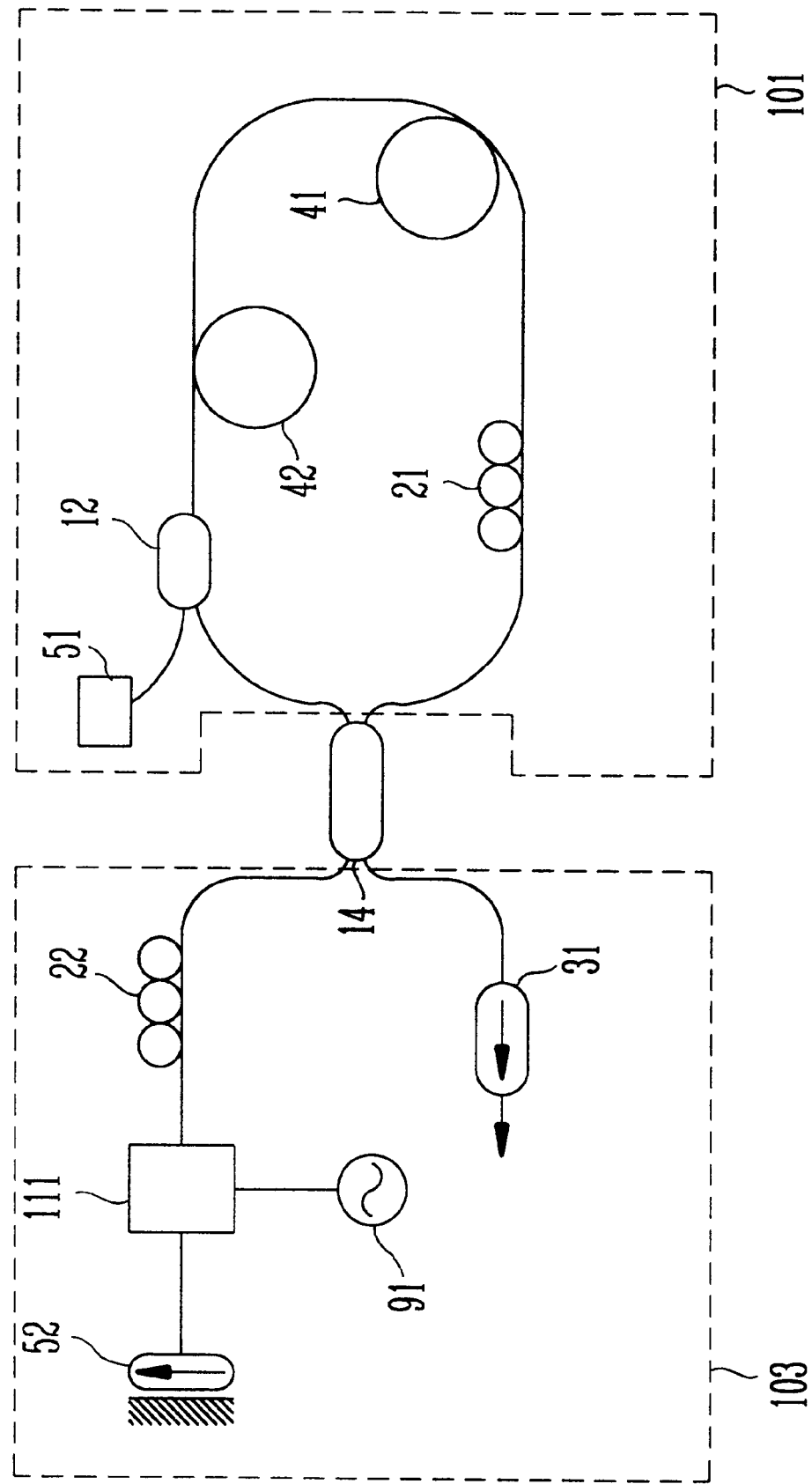
FIG. 4 shows a structure representing an optical fiber laser according to the present invention.

Turning now to FIG. 4, it illustrates a structure of an ultrashort optical pulse optical fiber laser with respect to the harmonic mode locking according to the present invention. As shown in the drawing, an opto-acoustic variable filter 111 which is manufactured by a two mode optical fiber instead of the optical modulator. Here, the reference numeral 14 denotes a 48:52 optical fiber directional coupler or fiber coupler, the reference numeral 12 a wavelength division multiplier fiber coupler, the reference numeral 21 and 22 a polarization controller, the reference numeral 31 an optical isolating polarizer, the reference numeral 41 a dispersion shifted optical fiber, the reference numeral 42 an Erbium doped optical fiber, the reference numeral 51 a 980 nm optical pumping laser diode, the reference numeral 52 a Faraday rotator mirror, the reference numeral 111 an acousto-optic variable filter, the reference numeral a function generator 91, the reference numeral 101 a non-linear amplifying loop mirror, and the reference numeral 103 a linear mirror, respectively.

In the figure, ten 110 meter of the optical fiber 42 as a gain medium, which has 800 ppm of Erbium doped rate, is positioned at the one end of the non-linear amplifying loop mirror 101. Seventeen 17 meter of the dispersion shifted fiber 41 which has 1550 nm of zero dispersion wavelength is then connected to the remaining portion of the loop in order to obtain a non-linear effect. In order to return back the deflection in the non-linear amplifying loop mirror 101, the polarization controller 21 is inserted therein. The dispersion value of the dispersion shifted fiber 41 in the 1550 nm is given as follows:

|D|=3.5 ps/nm/km

The optical pumping with the 980 nm optical pumping laser diode 51 is then made by the use of the 980/1550 wavelength division multiplier fiber coupler 12. At the linear mirror, the acousto-optic variable filter 111 for allowing the frequency, which acts as a mode locker for achieving the harmonic mode locking, to be moved, and allowing the wavelength to be transmitted at a regular linewidth, the Faraday rotator mirror 52 for 90° shifting the polarization of light reflected relative to the input light, and the polarization controller 22 for controlling the polarization, are inserted. The 48:52 optical fiber directional coupler or fiber coupler 14 is connected between the non-linear amplifying loop mirror 101 and the linear mirror 103. The total length of the non-linear loop mirror 101 is 29.5 m, and the total length of the linear mirror 103 is 59.5 m for which the longitudinal duration of the resonator corresponding to the total length thereof is 1.384663 MHx. The output optical signal is then received through the other remaining mirror port of the non-linear amplifying loop mirror 101.

The method of accomplishing the harmonic mode locking in the structure as mentioned above will be described hereinafter. In order to coincide the frequency component of the acousto-optic variable filter 111 with the longitudinal mode component of the laser resonator, the frequency applied from the function generator 91 to the non-linear amplifying loop mirror 101 is controlled. At the time, when the frequency is regularly controlled, it can be seen that the harmonic mode locking occurs at a certain frequency. If the harmonic mode locking occurs, this means that the nth frequency component of the acousto-optic variable filter 111 and the mth longitudinal mode components of the laser resonator coincides each other. In the present invention, it can be seen that when the frequency applied to the acousto-optic variable filter 111 is 3.046259 MHz, the harmonic mode locking occurs. At the time, the harmonic mode locking frequency occurred is 15.231259 MHz. Therefore, the longitudinal mode component of the laser resonator corresponding to this frequency is 11th frequency components.

As fully described above, according to the present invention, it has advantageous effects that the harmonic mode locking can be obtained by inserting the acousto-optic variable filter between the Faraday rotator mirror and the 3 dB directional coupler in the structure utilizing the non-linear amplifying loop mirror and the Faraday rotator mirror.

Although the present invention and its advantages have been described in detail, it should be understood that various changes, substitutions and alterations can be made herein without departing from the spirit and scope of the invention as defined by the appended claims.

What is claimed is:

1. An optical fiber laser for harmonic mode locking comprises:

a non-linear amplifying loop mirror which comprises an optical pumping laser diode for outputting light which excites a gain medium to oscillate a desired optical wave, a wavelength division multiplier fiber coupler for receiving the light outputted from the optical pumping laser diode, an Erbium doped optical fiber for sequentially oscillating the desired optical wave by receiving the light outputted from the optical pumping laser diode through the wavelength division multiplier fiber coupler, a dispersion shifted optical fiber for providing the light, which is oscillated at the Erbium doped optical fiber to travel it, with the non-linear effect, and a first polarization controller for controlling the polarization of the traveled light to allow the output of the sequentially oscillated light wave to be maximized;

a linear mirror which comprises a second polarization controller for controlling the polarization of the traveled light to allow the light wave oscillated at the non-linear amplifying loop mirror to be mode-locked, a Faraday rotator mirror for 90° shifting the polarization of light when the traveled light wave is reflected from a minor surface, an acousto-optic variable filter for modulating the amplitude of the traveled light wave, and a function generator for controlling the frequency applied to the acousto-optic variable filter; and an optical fiber directional coupler or fiber coupler connected between the non-linear amplifying loop mirror and the linear mirror, for transferring a portion of the optical wave outputted from the non-linear amplifying loop mirror to the linear mirror, transferring the remaining portion of the optical wave to an output port, and transferring the optical wave reflected from to the linear mirror to the non-linear amplifying loop mirror, respectively.

2. A method of harmonic mode locking using an optical fiber laser as defined in claim 1 is characterized in that a harmonic mode locking is performed utilizing a harmonic frequency component of the optical modulator in such a way that the frequency is applies to the optical fiber laser which is constituted with a non-linear amplifying loop mirror and a Faraday rotator mirror.

3. A method of harmonic mode locking using an optical fiber laser as defined in claim 1 is characterized in that the harmonic mode locking is performed by matching a frequency component of an optical modulator and a frequency component of a longitudinal mode in a laser resonator.

* * * * *